Oct. 12, 1926.

W. F. DODSON

PLANT PROTECTOR

Filed Oct. 1, 1925

1,602,654

Inventor
William Floyd Dodson

Patented Oct. 12, 1926.

1,602,654

UNITED STATES PATENT OFFICE.

WILLIAM FLOYD DODSON, OF RINGGOLD, VIRGINIA, ASSIGNOR OF ONE-FOURTH TO CARSON THOMAS McDANIEL AND ONE-FOURTH TO ELLIS HAYLAM HENDERSON, BOTH OF WASHINGTON, DISTRICT OF COLUMBIA.

PLANT PROTECTOR.

Application filed October 1, 1925. Serial No. 59,886.

This invention relates to protective devices for plants or the like and has for its primary object the provision of a plant protector adapted to completely shield the plant from the ravages of frost, insects, bugs, etc.

In particular the invention provides a novel plant protector designed to completely cover or enclose the plant to the exclusion of all damaging agents, at the same time permitting of no interference to the growth of the plant as brought about by sunlight, water and air. Further objects of the invention and novel features thereof will be hereinafter set forth.

The accompanying drawing illustrates one practical plant protector embodying the invention which will be described in detail to enable others to understand and use the same, but the invention is not considered restricted to the specific construction shown in the drawing and reference is therefore had to the accompanying claims for summaries of the essential features of the invention and novel features of construction and novel combinations of parts for all of which protection is desired.

Figure 1:
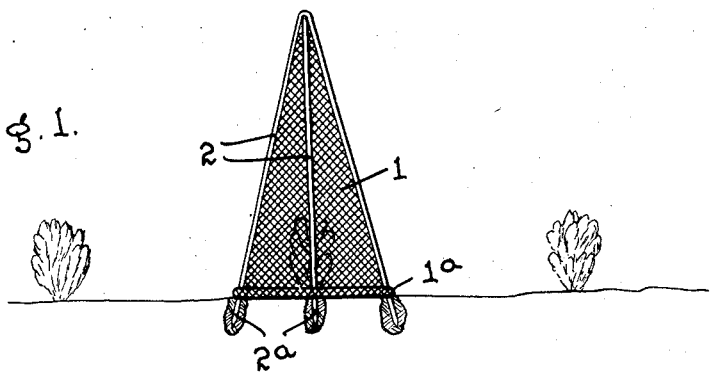
Figure 1 is a diagrammatic view of a row of plants illustrating the plant protector positioned around one of the plants.
Figure 2:
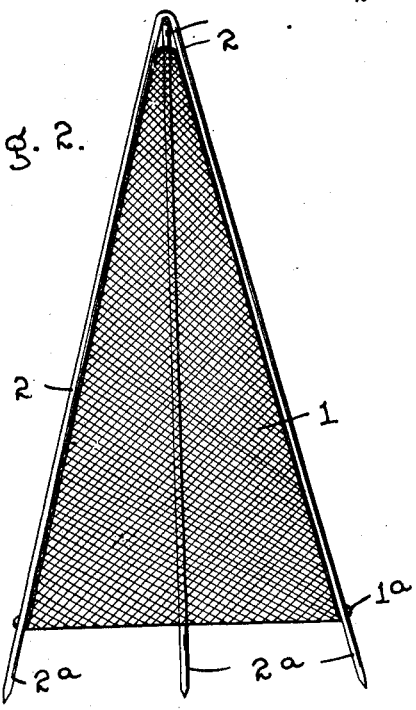
Figure 2 is a vertical sectional view through the novel plant protector.

As shown in the drawings the plant protector 1 may be made of any suitable reticulated material, which will permit of no interference to either sunlight, water or air, preferably wire mesh. The plant protector may be of any desired shape such as substantially square, semi-globular or conical, the conical form being preferred with the essential feature that it be entirely closed at the top and open at the bottom or base thereof. The size may be determined by the type and growth of the plant it is desired to cover and protect. An integral turned up portion or bead 1ª is provided at the base thereof for a purpose to be hereinafter more fully described.

Suitable anchoring means are provided for rigidly securing the protector in surrounding relationship to the plant it is desired to protect. Preferably crossed wires or legs 2 are provided conforming to the exterior of the protector but being of greater length. These legs are provided with sharpened extremities 2ª which may be readily forced into the ground and will thus anchor the device in proper position. Suitable apertures are provided within the bead 1ª for the passage of the extremities of the legs 2ª thus securely holding the anchoring devices and plant protector together.

It can be readily seen that an economical and convenient device has thus been described which will completely protect the plant from bugs, worms, insects or the like. In the event of a frost, the first moisture will settle upon the reticulated material and adhere thereto to the exclusion of cold air and the prevention of "frost-bite". Upon a rise of temperature this will evaporate and permit of air of proper temperature reaching the plant.

Figure 3:
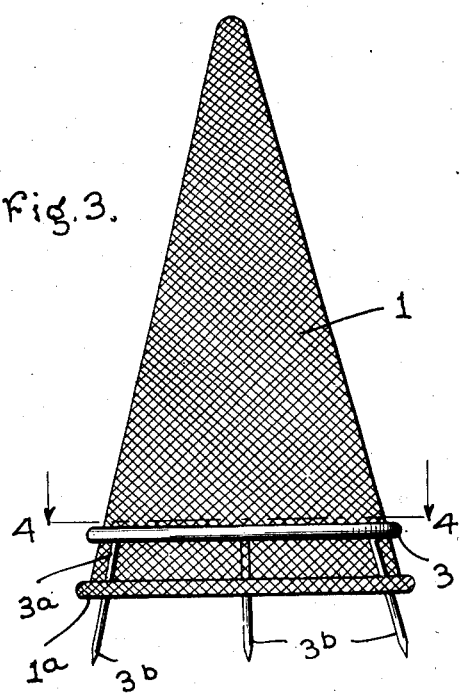
Figure 3 is a slide elevation of a plant protector illustrating a modified form of anchoring means.
Figure 4:
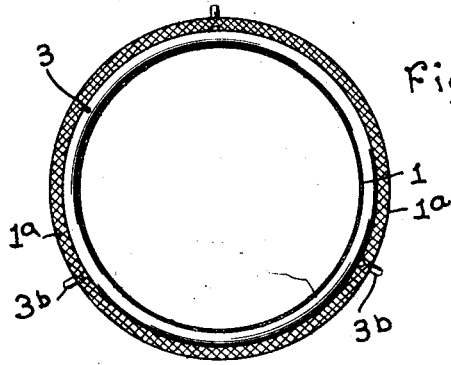
Figure 4 is a horizontal sectional view on the line 4—4 of Figure 3.

In Figures 3 and 4 there has been illustrated a slightly modified form of anchoring means comprising a ring 3 having a plurality of downwardly depending legs 3ª having sharpened extremities 3ᵇ. These legs are adapted to pass through apertures in the bead 1ª of the plant protector 1. In the use of this type of anchorage the device is positioned around the plant and the ring then passed over the protector until it contacts with the conical sides thereof. Upon the legs 3ᵇ being imbedded in the ground the device will be securely positioned around the plant.

The invention having thus been described what is claimed is:

1. A plant protector comprising a reticulated body or canopy having an integral bead at the base thereof and separable anchoring means adapted to pass over the outside of said body and through said bead.

2. A plant protector comprising a reticulated body or canopy having an integral bead at the base thereof, a plurality of perforations in said bead and anchoring means comprising a plurality of legs adapted to pass over the outside of said body and through the perforations in said bead.

3. A plant protector comprising a substantially conical reticulate body or canopy having an integral bead at the base thereof and anchoring means adapted to pass over the outside of said body and through said bead.

In testimony whereof he affixes his signature.

WILLIAM FLOYD DODSON.